United States Patent
Wang

(10) Patent No.: US 12,299,342 B2
(45) Date of Patent: May 13, 2025

(54) SCREEN PROJECTION METHOD, SCREEN PROJECTION APPARATUS, ELECTRONIC DEVICE AND COMPUTER READABLE MEDIUM

(71) Applicant: BOE TECHNOLOGY GROUP CO., LTD., Beijing (CN)

(72) Inventor: Ran Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/021,403

(22) PCT Filed: Jan. 27, 2022

(86) PCT No.: PCT/CN2022/074210
§ 371 (c)(1),
(2) Date: Feb. 15, 2023

(87) PCT Pub. No.: WO2023/141857
PCT Pub. Date: Aug. 3, 2023

(65) Prior Publication Data
US 2024/0264790 A1 Aug. 8, 2024

(51) Int. Cl.
*G06F 3/14* (2006.01)
*H04N 19/172* (2014.01)
*G06F 3/0484* (2022.01)

(52) U.S. Cl.
CPC ......... *G06F 3/1454* (2013.01); *H04N 19/172* (2014.11); *G06F 3/0484* (2013.01)

(58) Field of Classification Search
CPC .... G06F 3/1454; G06F 3/0484; H04N 19/172
See application file for complete search history.

(56) References Cited

U.S. PATENT DOCUMENTS

| 11,553,159 B1 * | 1/2023 | Rothschild ............. H04N 7/152 |
| 2017/0123635 A1 | 5/2017 | Zhang et al. |
| 2020/0174555 A1 * | 6/2020 | Kotsuji .................. G06F 3/013 |

(Continued)

FOREIGN PATENT DOCUMENTS

| CN | 106534547 A | 3/2017 |
| CN | 110852946 A | 2/2020 |

(Continued)

OTHER PUBLICATIONS

STIC Translation of CN111221491 (Year: 2020).*

*Primary Examiner* — Antonio Xavier
(74) *Attorney, Agent, or Firm* — HOUTTEMAN LAW LLC

(57) ABSTRACT

A screen projection method includes: generating original frame data based on original display data, and transmitting the original frame data to a target device, for the target device to display an original image generated based on the original frame data; receiving target area information transmitted by the target device, wherein the target area information is position information of a target area to be adjusted on the target device; extracting target display data from the original display data, based on the target area information; and generating target frame data based on the target display data, and transmitting the target frame data to the target device, for the target device to display a target image generated based on the target frame data.

20 Claims, 7 Drawing Sheets

(56) References Cited

U.S. PATENT DOCUMENTS

| | | | |
|---|---|---|---|
| 2021/0192686 A1* | 6/2021 | Kim | G06T 1/20 |
| 2024/0134591 A1* | 4/2024 | He | G06F 3/0481 |

FOREIGN PATENT DOCUMENTS

| | | | |
|---|---|---|---|
| CN | 111221491 A | 6/2020 |
| CN | 111666119 A | 9/2020 |
| CN | 111935532 A | 11/2020 |
| CN | 112073647 A | 12/2020 |
| CN | 112269527 A | 1/2021 |
| CN | 112306246 A | 2/2021 |
| CN | 112367543 A | 2/2021 |
| CN | 112947831 A | 6/2021 |
| CN | 113282262 A | 8/2021 |
| IN | 112911362 A | 6/2021 |
| JP | 2019004221 A | 1/2019 |

* cited by examiner

SCREEN PROJECTION METHOD, SCREEN PROJECTION APPARATUS, ELECTRONIC DEVICE AND COMPUTER READABLE MEDIUM

TECHNICAL FIELD

The present disclosure relates to the technical field of internet, and in particular to a screen projection method, a screen projection apparatus, an electronic device and a computer readable medium.

BACKGROUND

With the development of large-size display devices, the applications of display devices such as advertising machines, information screens and conference machines with different sizes are gradually expanded, but theses display devices cannot be directly touched and operated due to factors such as use scenes and the like, and cannot be connected to input devices such as a mouse and the like, being limited by installation environments, causing inconvenience to control and operate theses display devices.

Through projecting content displayed by the large-size display device to a mobile terminal such as a mobile phone or a PAD by means of screen projection, and through a reverse control of the mobile terminal, the control and operation on the large-size display device can be realized.

SUMMARY

The present disclosure aims to provide a screen projection method, a screen projection apparatus, an electronic device and a computer readable medium.

The first aspect of the present disclosure provides a screen projection method for a source device, including:
  generating original frame data based on original display data, and transmitting the original frame data to a target device, for the target device to display an original image generated based on the original frame data;
  receiving target area information transmitted by the target device, where the target area information is position information of a target area to be adjusted on the target device;
  extracting target display data from the original display data, based on the target area information; and
  generating target frame data based on the target display data, and transmitting the target frame data to the target device, for the target device to display a target image generated based on the target frame data.

The target area information includes coordinate information of the target area; and
  extracting the target display data from the original display data based on the target area information, includes:
  determining an encoding area based on the coordinate information of the target area; and
  extracting the target display data from the original display data according to the encoding area.

Generating the target frame data based on the target display data, includes:
  encoding the target display data based on a preset encoding resolution, to generate the target frame data.

After generating the target frame data based on the target display data and sending the target frame data to the target device, the method further includes:
  receiving and storing coordinate update information returned by the target device, where the coordinate update information is based on the target area information and a resolution of a user interface of the source device.

Generating the original frame data based on the original display data, includes:
  synthesizing the original display data, to obtain display data; and
  encoding the display data, to obtain the original frame data.

The second aspect of the present disclosure provides a screen projection method for a target device, including:
  obtaining an original image based on original frame data, and displaying the original image, where the original frame data is frame data generated and transmitted by a source device based on original display data;
  acquiring target area information, and transmitting the target area information to the source device;
  receiving target frame data, where the target frame data is frame data generated by the source device based on target display data, which is extracted from the original display data by the source device, based on the target area information; and
  obtaining a target image based on the target frame data, and displaying the target image.

Acquiring the original image based on the original frame data and displaying the original image, includes:
  decoding the original frame data to obtain the original image; and
  displaying the original image in a user interface.

Acquiring the target area information, includes:
  acquiring trajectory information in response to an activation command, where the trajectory information is information of a trajectory when a user selects a target area on the target device; and
  determining the target area information based on the trajectory information.

Determining the target area information based on the trajectory information, includes:
  determining coordinates of a start point and coordinates of an end point of a movement trajectory based on the trajectory information, and
  determining the target area information based on the coordinates of the start point and the coordinates of the end point.

Determining the target area information based on the trajectory information, includes:
  determining coordinates of a start point and coordinates of an opposite corner opposite to the start point of a movement trajectory, based on the trajectory information; and
  determining the target area information based on the coordinates of the start point and the coordinates of the opposite corner.

After obtaining the target image based on the target frame data and displaying the target image, the method further includes:
  determining coordinate update information based on the target area information and a width and a height of a resolution of the source device; and
  transmitting the coordinate update information to the source device.

A third aspect of the present disclosure provides a screen projection apparatus for a source device, including:
  a generating module configured to generate original frame data based on original display data;

a first sending module configured to transmit the original frame data to a target device, for the target device to display an original image generated based on the original frame data;

a first receiving module configured to receive target area information transmitted by the target device, where the target area information is position information of a target area to be adjusted on the target device; and an extraction module configured to extract target display data from the original display data based on the target area information, where the generating module is further configured to generate target frame data based on the target display data; and the first sending module is further configured to transmit the target frame data to the target device, for the target device to display a target image generated based on the target frame data.

The target area information includes coordinate information of the target area; and the extraction module includes:

a determining unit configured to determine an encoding area based on coordinate information of the target area; and an extraction unit configured to extract the target display data from the original display data according to the encoding area.

The generating module is configured to encode the target display data based on a preset encoding resolution to generate the target frame data.

The first receiving module is further configured to receive coordinate update information returned by the target device, where the coordinate update information is information determined based on the target area information and a width and a height of a resolution of the source device, and the apparatus further includes a storage module configured to store the coordinate update information.

The generating module includes:

a synthesizing unit configured to input display information of the original image into a virtual display device for synthesis, to obtain display data, where the virtual display device is a virtual display device created through Surface Composer Client, and the encoding unit is configured to encode the display data to obtain the original frame data.

The fourth aspect of the present disclosure provides a screen projection apparatus for a target device, including:

an obtaining module configured to obtain an original image based on original frame data, where the original frame data is frame data generated and transmitted by a source device based on original display data;

a display module configured to display the original image;

an acquisition module configured to acquire target area information;

a second sending module configured to transmit the target area information to the source device;

a second receiving module configured to receive target frame data, where the target frame data is frame data generated by the source device based on target display data, which is extracted from the original display data by the source device, based on the target area information, and the obtaining module is further configured to obtain a target image based on the target frame data; and the display module is further configured to display the target image.

The obtaining module includes:

a decoding unit configured to decode the original frame data to obtain the original image.

The acquisition module includes:

a response unit configured to respond to an activation command;

an acquisition unit configured to acquire trajectory information, where the trajectory information is information of a movement trajectory of a user on a user interface of the target device; and a determining unit configured to determine the target area information based on the trajectory information.

The determining unit includes:

a first determining subunit configured to determine coordinates of a start point and coordinates of an end point of the movement trajectory based on the trajectory information; and a second determining subunit configured to determine the target area information based on the coordinates of the start point and the coordinates of the end point.

The determining unit includes:

a third determining subunit configured to determine coordinates of a start point and a coordinate of coordinates of an opposite corner opposite to the start point of the movement trajectory, based on the trajectory information; and a fourth determining subunit configured to determine the target area information based on the coordinates of the start point and the coordinates of the opposite corner.

The apparatus further includes:

a coordinate information update module configured to determine coordinate update information based on the target area information and a width and a height of a resolution of the source device, and the second sending module is further configured to transmit the coordinate update information to the source device.

A fifth aspect of the present disclosure provides an electronic device, including:

one or more processors;

a memory with one or more programs stored thereon, when the one or more programs are executed by the one or more processors, the one or more processors being caused to implement the method according to any one of the first and second aspects; and one or more I/O interfaces connected between the one or more processors and the memory, and configured to enable information interaction between the one or more processor and the memory.

A sixth aspect of the present disclosure provides a computer readable medium with a computer program stored thereon, when the program is executed by a processor, the method according to any one of the first and second aspects is implemented.

Figure 1:
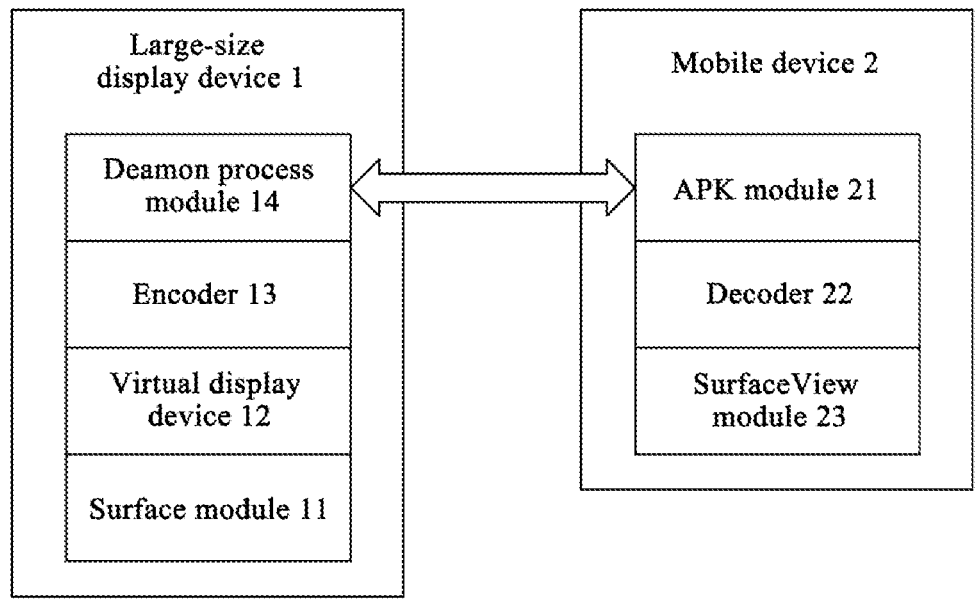
FIG. 1 is a diagram illustrating an application scene of screen projection between a large-size display device and a mobile device.

The reference characters are: 1. a large-sized display device; 2. a mobile device; 11. a Surface module; 12. a virtual display device; 13. an encoder; 14. a daemon process module; 21. an application package module; 22. a decoder; 23. a SurfaceView module; 700. a screen projection apparatus; 701. a generating module; 702. a first sending module; 703. a first receiving module; 704. an extraction module; 800. a screen projection module; 801. an obtaining module; 802. a display module; 803. an acquisition module; 804. a second sending module; 805. a second receiving module; 806. a coordinate information updating module; 900. an acquisition module; 901. a response unit; 902. an acquisition unit; 903. a determining unit; 1201. a processor; 1202. a memory; and 1203. an I/O interface.

DETAIL DESCRIPTION OF EMBODIMENTS

To improve understanding of the technical solution of the present disclosure/utility model for one of ordinary skill in the art, the present disclosure/utility model will be described in detail below with reference to accompanying drawings and specific implementations.

Unless defined otherwise, technical or scientific terms used herein shall have the ordinary meaning as understood by one of ordinary skill in the art to which this disclosure belongs. The use of "first", "second", and the like in the present disclosure is not intended to indicate any order, quantity, or importance, but rather serves to distinguish one element from another. Also, the term "a", "an", "the" or the like does not denote a limitation of quantity, but rather denotes the presence of at least one. The word "comprising", "comprises", or the like means that the element or item preceding the word includes the element or item listed after the word and its equivalent, but does not exclude other elements or items. The term "connected", "coupled" or the like is not restricted to physical or mechanical connections, but may include electrical connections, whether direct or indirect. The terms "upper", "lower", "left", "right", and the like are used only to indicate relative positional relationships, and when the absolute position of the object being described is changed, the relative positional relationships may also be changed accordingly.

Display content of a large-size display device is projected to a mobile terminal, and a reverse control on the large-size display device can be realized by means of the mobile terminal. However, since the large-size display device has a relatively high display resolution and the display screen of the mobile terminal is relatively small in size, when a user interface (UI for short) of the large-size display device is projected onto the mobile terminal, the user interface of the large-size display device is required to be scaled down, which causes that UI controls such as manipulation keys are displayed to be too small, and thus operation is difficult. Meanwhile, since the large-size display device has the high display resolution, low-resolution encoding is required for the screen projection based on encoding. Otherwise, transmission efficiency will be affected due to overlarge data size, and even a key frame will be lost, causing the screen blurred and indistinct. However, the low-resolution encoding may cause a defect that a projection screen on the mobile device is not clear, and especially affects a viewing effect of a key area.

FIG. 1 is a diagram illustrating an application scene of screen projection between a large-size display device and a mobile device. As shown in FIG. 1, the large-size display device 1 may obtain video display data, encode the video display data to obtain frame data, and send the frame data to the mobile device 2. The mobile device 2 decodes the frame data to obtain a video, and display the video in a user interface.

Taking an Android system as an example, a native layer of the large-size display device 1 creates a virtual display device 12, acquires video display data of a Surface module 11, performs encoding by means of an encoder (for example, MediaCodec) 13 to obtain frame data (for example, an H.264 code stream), and sends the frame data to an application package (android application package, for short, APK) module 21 of the mobile device 2 through a daemon process (for example, Deamon process) module 14. The frame data is then decoded by a decoder (e.g., MediaCodec) 22 and displayed in a window created by means of a SurfaceView module 23.

It should be noted that the large-size display device mentioned in the embodiment of the present disclosure is a relative concept, and the term "large-size" does not mean to limit the size of the display device. Generally, a large-size display device refers to a display screen with a size of more than 42 inches. Since such display screen is not connected to input devices such as a mouse, a keyboard and the like, due to factors such as environment and the like, such display screen cannot be manipulated. Through the screen projection method according to the embodiment of the present disclosure, the display screen can be manipulated by means of the mobile terminal. However, the definition of the large-size display device in the embodiment of the present disclosure is not limited to this. In fact, even if the display screen is smaller than 42 inches, if the input device is not connected to the display screen, and it is desired to manipulate the display screen, the display screen may be manipulated by means of the mobile terminal with the screen projection method according to the embodiment of the present disclosure.

It should be further noted that, in the embodiment of the present disclosure, the mobile device may be a device such as a mobile phone, an IPAD, or the like, or may be other devices that are convenient to carry and is convenient for a user to operate, such as a notebook computer, or a small mobile device that is used in cooperation with a large-size display device. The operation on the mobile device can reversely control the large-size display device, so that only frame data in a scaled-up area is displayed on the mobile device, thereby facilitating control of the large-size display device.

In a first aspect, a screen projection method according to an embodiment of the present disclosure is applied to a source device (e.g., a large-size display device), and the screen projection method may dynamically adjust display content of a user interface of a target device (e.g., locally enlarge a UI control area), so as to improve definition of the user interface of the target device.

Figure 2:
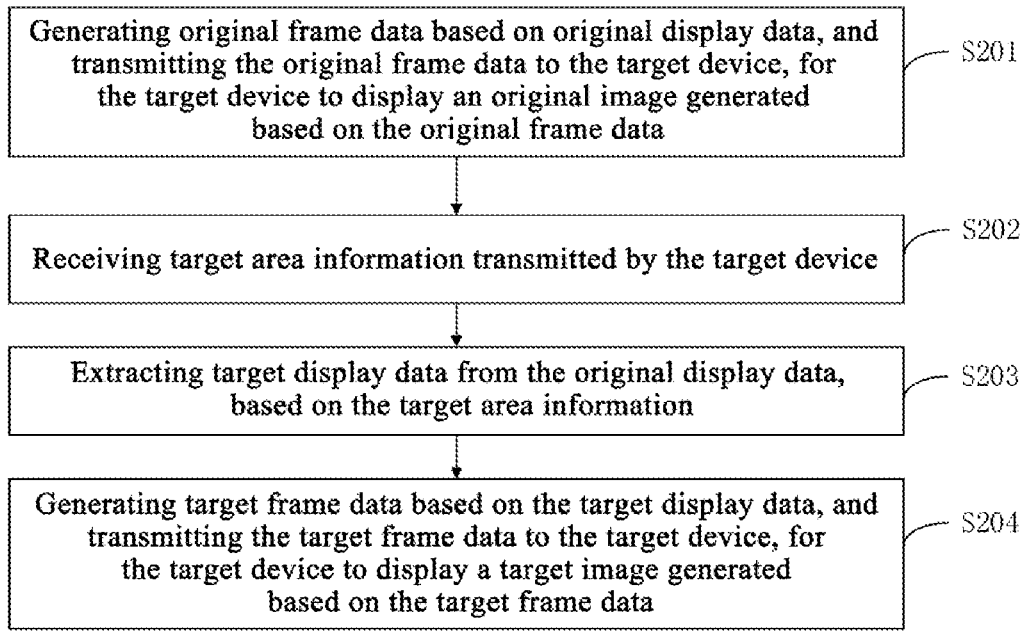
FIG. 2 is a flowchart of a screen projection method according to an embodiment of the present disclosure.

FIG. 2 is a flowchart of a screen projection method according to an embodiment of the present disclosure. As shown in FIG. 2, the screen projection method includes the following steps.

Step S201, generating original frame data based on original display data, and transmitting the original frame data to the target device, for the target device to display an original image generated based on the original frame data.

The original display data is display data without being subjected to selection, and may be displayed in the user interfaces of the source device and the target device at the same time, that is, the source device projects the original image to the target device.

Generally, the original display data is not directly sent to the target device, but is processed to obtain the original frame data, and then the original frame data is sent to the target device. In some embodiments, the original display data is encoded to obtain the original frame data. The encoding manner and the format of the original frame data are not limited by the embodiment of the present disclosure. For example, in the Android system, the original display data is encoded by means of MediaCodec, to obtain the original frame data in H.264 format.

In some embodiments, after receiving the original frame data, the target device processes the original frame data to acquire the original image, and displays the original image on a user interface (window). The manner of processing the original frame data by the target device is matched with the manner of processing the original display data by the source device. For example, where the source device performs decoding processing on the original display data by means of MediaCodec, the target device decodes the original frame data by means of MediaCodec, to obtain the original image.

In some embodiments, a size of the user interface of the target device is less than a size of the user interface of the source device. That is, the user interface of the source device is larger, and the user interface of the target device is smaller. An image displayed on the source device corresponding to the original image is larger than an image displayed on the target device corresponding to the original image. Especially in a case where the user interface of the source device and the user interface of the target device are quite different from each other, a size of the image displayed on the source device differs greatly from a size of the image displayed on the target device, which is not beneficial for the user to manipulate the UI controls (button areas) on the target device. Therefore, the image of the UI controls is required to be scaled up on the target device.

Step S202, receiving target area information transmitted by the target device.

The target area information is position information of a target area to be adjusted on the target device. The target area may be any area in the original image. The target area is not limited by the embodiment of the present disclosure. For example, the target area may be an area where the UI control is located.

The specific manner of the adjusting operation is not limited by the embodiment of the present disclosure. For example, the adjusting operation may be an operation such as scaling up, or the like.

In some embodiments, the position information of the target area may be information such as a point, a line, or the like, for determining the target area, which is not limited by the embodiment of the present disclosure. For example, the position information of the target area may be coordinate information of some points in the target area.

In some embodiments, the source device and the target device are connected together by signals for data transmission therebetween. The connection manner between the source device and the target device is not limited by the embodiment of the present disclosure. For example, the connection manner includes any one of a user datagram protocol (UDP), a data transmission protocol (UDT), and a transmission control protocol (TCP).

Step S203, extracting target display data from the original display data, based on the target area information.

The target display data is a part of display data in the original display data. In some embodiments, the target display data is display data corresponding to the target area selected by a user.

Step S204, generating target frame data based on the target display data, and transmitting the target frame data to the target device, for the target device to display a target image generated based on the target frame data.

The manner of processing the target display data is not limited by the embodiment of the present disclosure. For example, the target display data may be processed in the same manner as that of processing the original display data, to obtain the target frame data.

For example, an encoding processing is performed on the target display data by means of MediaCodec, to obtain the target frame data in H.264 format.

In the screen projection method according to the embodiment of the present disclosure, after the target area information is received, the target display data is extracted from the original display data based on the target area information, and the target frame data is generated based on the target display data, so that dynamically adjusting the display range of the target device is realized, which is convenient for a user to operate on the target device. In addition, since the target display data is directly extracted from the original display data, the resolution of the target display data can be adjusted. Further, compared with the original display data, pixels of the encoding area are reduced in the target display data, so that the resolution of the encoding can be improved, thereby improving the definition of the target device.

Figure 3:
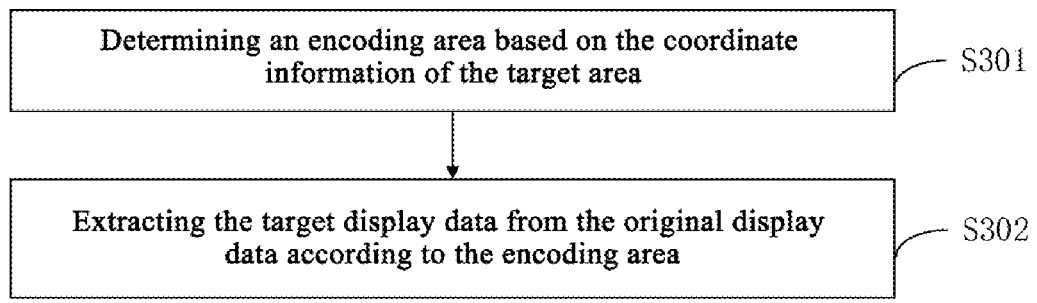
FIG. 3 is a flow chart of extracting target display data from original display data based on target area information in an embodiment of the present disclosure.

In some embodiments, the target area information includes coordinate information of the target area. As shown in FIG. 3, in step S203, extracting the target display data from the original display data, based on the target area information, includes the following steps.

Step S301, determining an encoding area based on the coordinate information of the target area.

Step S302, extracting the target display data from the original display data according to the encoding area.

In the embodiment of the present disclosure, the target area may be determined by a movement trajectory of the user on a user interface of the target device. The coordinates of the target area in the user interface may be determined through the movement trajectory, the coordinates of the target area in the original image may be determined based on the coordinates in the user interface, and then the position of the target area in the original display data is determined.

For example, when the target area is a rectangular area, through moving on the user interface in a touch manner, the rectangular area may be determined through the movement trajectory. Since there is a corresponding relationship between the coordinates in the user interface and the coordinates in the original image, the coordinates of the target area in the original image may be determined through coordinates of corners of the rectangular area.

Figure 4A:
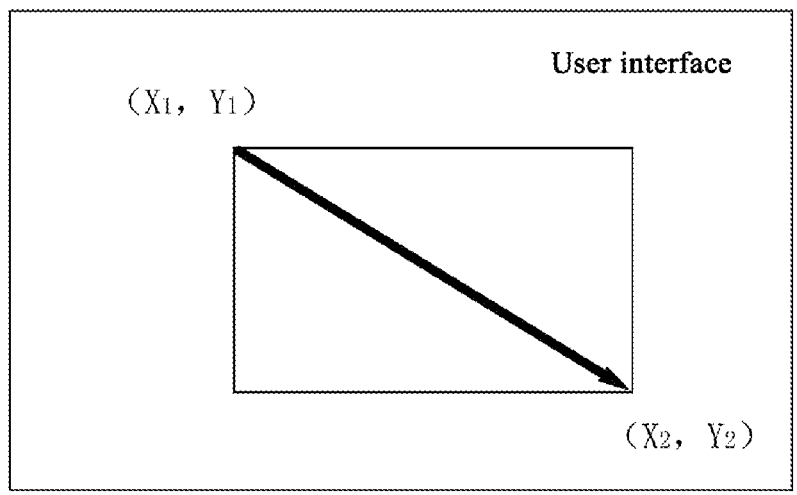
FIG. 4a is a schematic diagram of selecting a target area according to an embodiment of the present disclosure.

FIG. 4a is a schematic diagram of selecting a target area according to an embodiment of the present disclosure. As shown in FIG. 4a, the user draws an oblique line with a finger on the user interface of the target device to select the target area. That is, the movement trajectory of the finger is an oblique line. For example, when the user moves diagonally from top left to bottom right on the user interface, a start point (a pressing point of the finger) and an end point (a lifting point of the finger) of the movement trajectory are two corners of the target area, and the rectangular target area can be determined by the two corners. The target device can accurately determine the target area according to the coordinates (X1, Y1) of the start point and the coordinates (X2, Y2) of the end point of the finger on the user interface. The coordinates (X1, Y1) of the start point and the coordinates (X2, Y2) of the end point are the coordinates of the target area on the target device. There is a corresponding relationship between the coordinates on the target device and the coordinates in the original image, therefore the coordinates of the target area in the original image can be determined based on the coordinates (X1, Y1) of the start point and the coordinates (X2, Y2) of the end point. The source device may also determine the target area based on the coordinates of the start point (X1, Y1) and the coordinates of the end point (X2, Y2). It should be noted that the moving direction of the finger is not limited to moving from top left to bottom right, and may alternatively be from bottom left to top right, from bottom right to top left, or from top right to bottom left.

Figure 4B:
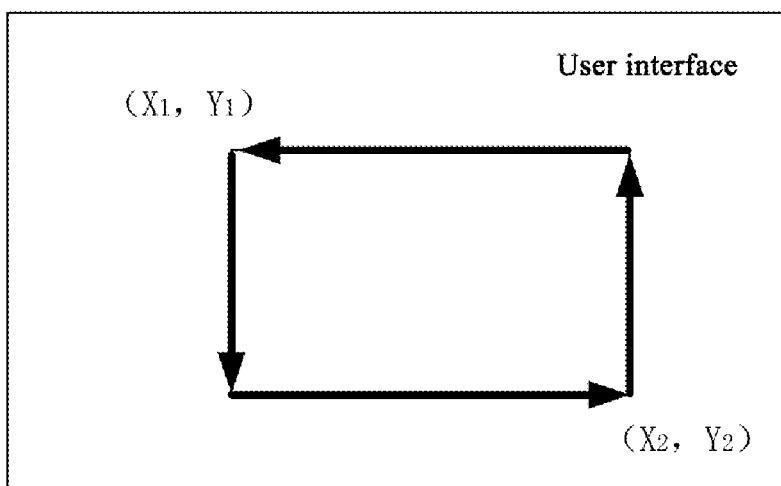
FIG. 4b is a schematic diagram of selecting a target area in another manner according to an embodiment of the present disclosure.

FIG. 4b is a schematic diagram of selecting a target area in another manner according to an embodiment of the present disclosure. As shown in FIG. 4b, the user selects the target area through drawing a box with a finger on the user interface of the target device, and the movement trajectory of the finger is a rectangle or nearly a rectangle. For example, the user moves down, moves right, moves up and moves left in sequence from the upper left corner of the target area, the moving process is counterclockwise, the finger is not lifted, and the movement trajectory is rectangular. The start point of the movement is the upper left corner of the target area, the point opposite to the start point is the opposite corner of the target area, and the target area can be determined through the start point and the corner opposite to the start point. The target device can determine the position of the rectangle according to the coordinates (X1, Y1) of the start point and the coordinates (X2, Y2) of the opposite corner, and the source device can also determine the target area according to the coordinates (X1, Y1) of the start point and the coordinates (X2, Y2) of the opposite corner. The finger may alternatively be moved clockwise.

In the embodiment of the present disclosure, the target device determines the target area information according to the trajectory information, and then sends the target area information to the source device, and the source device directly obtains the target area information. Alternatively, the target device may send all the trajectory information to the source device, and the source device determines the target area according to the trajectory information.

In some embodiments, the source device may extract display data corresponding to the target area from the original display data according to the target area information. The manner of extraction is not limited by the embodiment of the present disclosure.

In order to improve the pixel resolution of the target image, so that the target image can be clearly displayed in the user interface of the target device, in the embodiment of the present disclosure, when the target frame data is generated based on the target display data, the encoding resolution is determined by combining the resolution of the user interface (screen) of the target device, and then the target frame data is generated based on the encoding resolution and the target display data.

In some embodiments, in step S204, generating the target frame data based on the target display data, includes: encoding the target display data based on a preset encoding resolution, to generate the target frame data.

The encoding resolution may be preset according to the resolution of the user interface of the target device. Table 1 shows a corresponding relationship between the encoding resolution and the resolution of the user interface in the embodiment of the present disclosure, where the resolutions are downward compatible.

TABLE 1

| Serial No. | Resolution of user interface of target device | Encoding resolution |
| --- | --- | --- |
| 1 | 3840 × 2160 (ppi) | 640P |
| 2 | 1920 × 1080 (ppi) | 720P |
| 3 | 1280 × 720 (ppi) | 1080P |

In the embodiment of the present disclosure, the target display data is encoded based on the preset encoding resolution, to generate the target frame data, and since the resolution of the target frame data may be adjusted according to the configuration of the target device, the target image can be clearer.

In the embodiment of the present disclosure, the target display data may be encoded based on the encoding resolution in any manner, which is not limited by the embodiment of the present disclosure.

In some embodiments, after the step S204 of generating the target frame data based on the target display data and sending the target frame data to the target device, the method further includes: receiving and storing coordinate update information returned by the target device, to update the corresponding relationship between the coordinates on the target device and the coordinates in the original display data.

The coordinate update information is information determined based on the target area information and a width and a height of the resolution of the user interface of the source device. Since the image displayed by the target device changes with respect to the image displayed by the source device, the corresponding relationship between the coordinates on the target device and the coordinates in the original display data is required to be updated, so as to accurately determine the area to be encoded in the original display data in the subsequent process.

For example, for a rectangular target area, the coordinate update information is determined according to two coordinate points through which the target area can be determined, and the resolution of the user interface of the source device. For example, the coordinate points for determining the target area are the coordinates (X1, Y1) of the start point and the coordinates (X2, Y2) of the end point, the coordinates (Xd, Yd) in data are recalculated. The coordinate update information is updated coordinates (Xd, Yd) in data, and the updated coordinates (Xd, Yd) in data may be determined according to the following calculation formulas (1) to (4):

$$X_d = X_1 + X \times X'; \quad (1)$$

$$Y_d = Y_1 + Y \times Y'; \quad (2)$$

$$X' = \frac{W}{X_2 - X_1}; \quad (3)$$

and $$Y' = \frac{H}{Y_2 - Y_1}. \quad (4)$$

Where $X_d$ is the updated abscissa, $Y_d$ is the updated ordinate, W is the resolution width of the source device, and H is the resolution height of the source device.

In the embodiment of the present disclosure, the target device calculates the coordinate update information according to magnification ratio of the target area, where the coordinate update information is used for reverse control on the source device, so that the source device simulates a touch position of the target device.

In some embodiments, in step S201, generating the original frame data based on the original display data, includes: synthesizing the display information of the original image, to obtain display data; and encoding the display data to obtain the original frame data.

For example, taking the Android system as an example, a virtual display device is created through Surface Composer Client, and the virtual display device is registered in a display device list of the Android system. When Surface Flinger has an image update, image update information (a part of display information of the original image) is sent to the virtual display device to perform a synthesis of an open source graphics library for embedded system (OpenGL for Embedded Systems, abbreviated as GLES), to obtain display data. That is, the virtual display device obtains the image update data of the source device.

While creating the virtual display device, taking Surface of MediaCodec for encoding as BufferQueue, to synchronously acquire the GLES-synthesized display data, and performing H.264 encoding on the display data through MediaCodec, to obtain the original frame data.

In the embodiment of the present disclosure, in step S204, generating the target frame data based on the target display data includes: synthesizing the target image display information, to obtain display data; and encoding the display data, to obtain the target frame data.

It should be noted that, the generation of target frame data based on target display data is the same as the generation of the original frame data based on original display data, and differs in that the target image display information is the object of synthesis, and the target frame data is generated.

In some embodiments, before step S201, the method further includes: establishing network connection between the source device and the target device, to perform data interaction. The network connection between the source device and the target device may adopt any one of a user datagram protocol (UDP), a data transmission protocol (UDT), and a transmission control protocol (TCP). In the embodiment of the present disclosure, the source device may transmit the original frame data and the target frame data to the target device, and the target device may transmit the target area information to the source device, through any one of the above protocols.

In a second aspect, a screen projection method according to an embodiment of the present disclosure is applied to a target device (e.g., a portable device), and the screen projection method may dynamically adjust display content of a user interface of the target device, so as to improve definition of the user interface of the target device.

Figure 5:
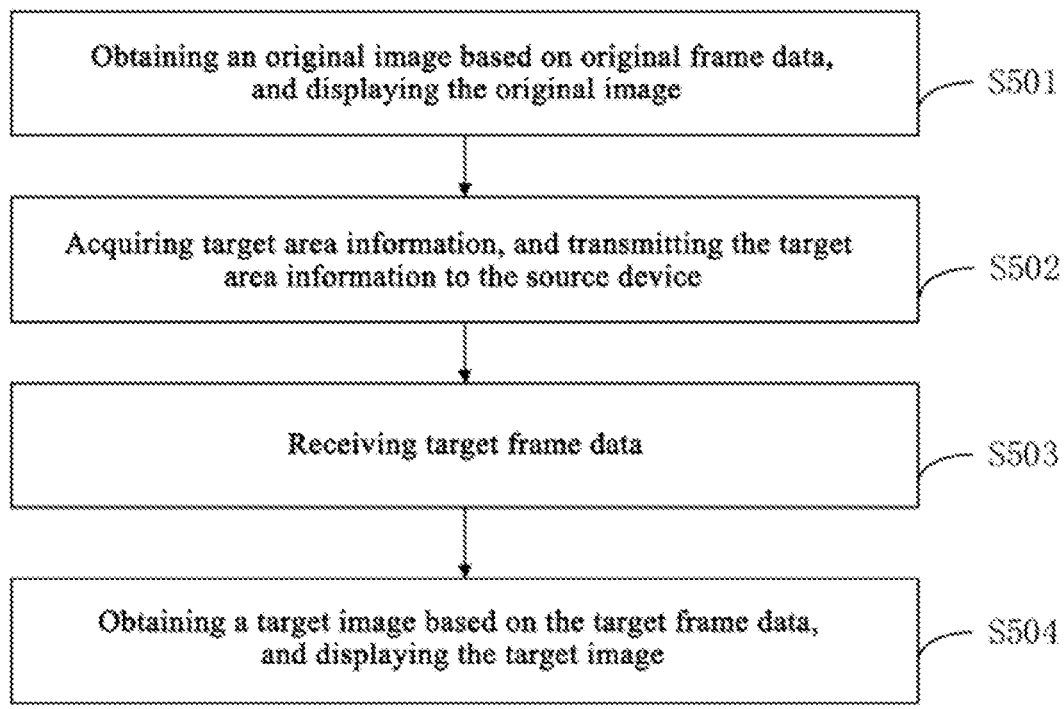
FIG. 5 is a flowchart of a screen projection method according to an embodiment of the present disclosure.

FIG. 5 is a flowchart of a screen projection method according to an embodiment of the present disclosure. As shown in FIG. 5, the screen projection method includes the following steps.

In step S501, obtaining an original image based on original frame data, and displaying the original image.

The original frame data is frame data generated and transmitted by a source device based on original display data, and the original display data is display data without being subjected to selection, and may be displayed on user interfaces of the source device and the target device.

Generally, the original display data is not directly sent to the target device, but is processed to obtain the original frame data, and then the original frame data is sent to the target device. In some embodiments, the original display data is encoded to obtain the original frame data. The encoding manner and the format of the original frame data are not limited by the embodiment of the present disclosure. For example, in the Android system, the original display data is encoded by means of MediaCodec, to obtain the original frame data in H.264 format.

In some embodiments, after receiving the original frame data, the target device processes the original frame data to acquire the original image, and displays the original image on a user interface. The manner of processing the original frame data by the target device is matched with the manner of processing the original display data by the source device. For example, where the source device performs decoding processing on the original display data by means of MediaCodec, the target device decodes the original frame data by means of MediaCodec, to obtain the original image.

In some embodiments, a size of the user interface of the target device is less than a size of the user interface of the source device. That is, the user interface of the source device is larger, and the user interface of the target device is smaller. An image displayed on the source device corresponding to the original image is larger than an image displayed on the target device corresponding to the original image. Especially in a case where the user interface of the source device and the user interface of the target device are quite different from each other, a size of the image displayed on the source device differs greatly from a size of the image displayed on the target device, which is not beneficial for the user to manipulate the UI controls (buttons) on the target device. Therefore, the image of the UI controls is required to be scaled up on the target device.

Step S502, acquiring target area information, and transmitting the target area information to the source device.

The target area information is position information of a target area to be adjusted on the target device. The target area may be any area in the original image. The target area is not limited by the embodiment of the present disclosure. For example, the target area may be an area where the UI control is located.

The adjusting operation of the target area is not limited by the embodiments of the present disclosure. For example, the adjusting operation may be an operation of scaling up.

In some embodiments, the position information of the target area may be information such as a point, a line, or the like, for determining the target area, which is not limited by the embodiment of the present disclosure. For example, the position information of the target area may be coordinate information of some points in the target area.

In some embodiments, the source device and the target device are connected together by signals for data transmission therebetween. The connection manner between the source device and the target device is not limited by the embodiment of the present disclosure. For example, the connection manner includes any one of a user datagram protocol (UDP), a data transmission protocol (UDT), and a transmission control protocol (TCP).

Step S503, receiving target frame data.

The target frame data is frame data generated by the source device based on target display data, which is extracted from the original display data by the source device, based on the target area information.

In the embodiment of the present disclosure, the steps and the method of extracting, by the source device, the target display data from the original display data based on the target area information are the same as in step S203, and the steps and the method of generating the target frame data based on the target display data are the same as in step S204, both of which are not described herein again.

Step S504, obtaining a target image based on the target frame data, and displaying the target image.

In the embodiment of the present disclosure, the target device decodes the target frame data to obtain the target image, and displays the target image in the user interface.

In some embodiments, the step S504 of obtaining the original image based on the original frame data and displaying the original image includes: decoding the original frame data to obtain the original image; and displaying the original image in a user interface.

In the embodiment of the present disclosure, the decoding mode of the target device is matched with the encoding mode of the source device. For example, where the source device performs decoding processing on the original display data by means of MediaCodec, the target device decodes the original frame data by means of MediaCodec, to obtain the original image.

Figure 6:
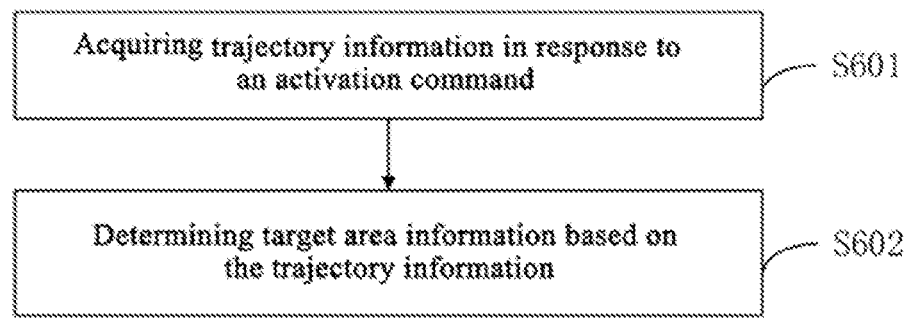
FIG. 6 is a flow chart of acquiring target area information in an embodiment of the present disclosure.

FIG. 6 is a flowchart of acquiring target area information in an embodiment of the present disclosure. As shown in FIG. 6, the step S502 of acquiring the target area information includes the following steps.

Step S601, responding to an activation command, and acquiring trajectory information.

The activation command is starting information of acquiring the target area, activated by a user on the user interface of the target device, and the trajectory information is information of a movement (touch) trajectory when the user selects a target area on the target device.

In some embodiments, after receiving the activation command, the target device monitors an operation action (e.g., a touch action) of the user on the user interface, acquires trajectory information of the operation action, and then determines the target area information based on the trajectory information. When the selection of the target area is finished, the monitoring on the operation trajectory is finished through an exit command.

In some embodiments, the movement trajectory may be an oblique line, a box shape, or other trajectory through which the target area can be determined. The shape of the target area may be a rectangle or other shape. Referring to FIG. 4a, the movement locus is an oblique line, through which a rectangular target area can be determined. Referring to FIG. 4b, the movement trajectory is a box shape, through which a rectangular target area can be determined.

The specific manner of the activation command and the exit command is not limited by the embodiment of the present disclosure. For example, the activation command and the exit command may be implemented by a floating window key in the user interface of the target device, clicking the floating window key may issue the activation command, and clicking the floating window key again may issue the exit command.

In the embodiment of the present disclosure, the dynamic adjustment of the user interface can be prevented from being started by mistake, through the activation command and the exit command.

Step S602, determining target area information based on the trajectory information.

In some embodiments, the step S602 of determining the target area information based on the trajectory information includes: determining coordinates of a start point and coordinates of an end point of the movement trajectory based on the trajectory information, and determining the target area information based on the coordinates of the start point and the coordinates of the end point.

As shown in FIG. 4a, where the movement trajectory is an oblique line, the start point (a pressing point of the finger) and the end point (a lifting point of the finger) of the movement trajectory are the start point and the end point of the movement trajectory, and are also two corners of the target area. The rectangular target area can be determined by the coordinates of the two corners. That is, the coordinates (X1, Y1) of the start point and the coordinates (X2, Y2) of the end point of the movement trajectory are the coordinates of the target area in the user interface. Since there is a corresponding relationship between the coordinates in the user interface and the coordinates in the original image, the coordinates of the target area in the original image can be determined.

In some embodiments, the step S602 of determining the movement trajectory target area information based on the movement trajectory information, includes: determining the coordinates of the start point and coordinates of an opposite corner opposite to the start point of the movement trajectory, based on the trajectory information; and determining the target area information based on the coordinates of the start point and the coordinates of the opposite corner.

Referring to FIG. 4b, where the movement trajectory is in a box shape, a start point of the movement trajectory is the upper left corner of the target area, a point opposite to the start point is the opposite corner of the target area, the target area can be determined by the coordinates of the start point and the coordinates of the opposite corner. That is, the position of the rectangle, i.e. the coordinates of the target area in the user interface can be determined according to the coordinates of the start point (X1, Y1) and the coordinates of the opposite corner (X2, Y2). Since there is a corresponding relationship between the coordinates on the target device and the coordinates in the original image, the coordinates of the target area in the original image can be determined based on the coordinates (X1, Y1) of the start point and the coordinates (X2, Y2) of the opposite corner.

In some embodiments, after receiving the target frame data transmitted by the source device, the target device displays a corresponding target image in the user interface. However, since the image displayed in the user interface of the target device is an image of the target image subjected to dynamic adjustment (e.g., dynamically scaling up), and the image displayed in the user interface of the source device is still an image of the original image, in this case, coordinates of the image displayed in the user interface of the target device have changed with respect to coordinates of the image displayed in the user interface of the source device. Therefore, it is necessary to obtain a corresponding relationship between the coordinates of the image displayed in the user interface of the target device and the coordinates of the image displayed in the user interface of the source device.

Therefore, after step S504 of obtaining the target image based on the target frame data and displaying the target image, the method further includes: determining coordinate update information based on the target area information and a width and a height of a resolution of the source device; and transmitting the coordinate update information to the source device.

The coordinate update information may be determined according to formulas (1) to (4) in the embodiment of the present disclosure, which is not described herein again.

It should be noted that, in the embodiment of the present disclosure, the original display data may be picture data, and the corresponding original image is a picture; alternatively, the original display data may be video data, and the corresponding original image is an image in the video.

In the screen projection method according to the embodiment of the present disclosure, after the target device determines the target area information based on the operation of the user, the source device extracts the target display data from the original display data based on the target area information, and generates the target frame data based on the target display data, and the target device displays the target image generated by the target frame data, so that dynamically adjusting the display range of the user interface of the target device is realized, for example, the UI control is locally scaled up, which is convenient for the user to operate on the target device. In addition, since the target display data is directly extracted from the original display data, the resolution of the target display data can be adjusted. Further, compared with the original display data, pixels of the encoding area are reduced in the target display data, so that the resolution of the encoding can be improved, thereby improving the definition of the target device.

In a third aspect, an embodiment of the present disclosure provides a screen projection apparatus, which is applied to a source device (e.g., a large-size display device), and the screen projection apparatus may dynamically adjust display content of a user interface of a target device, so as to improve definition of the user interface of the target device.

Figure 7:
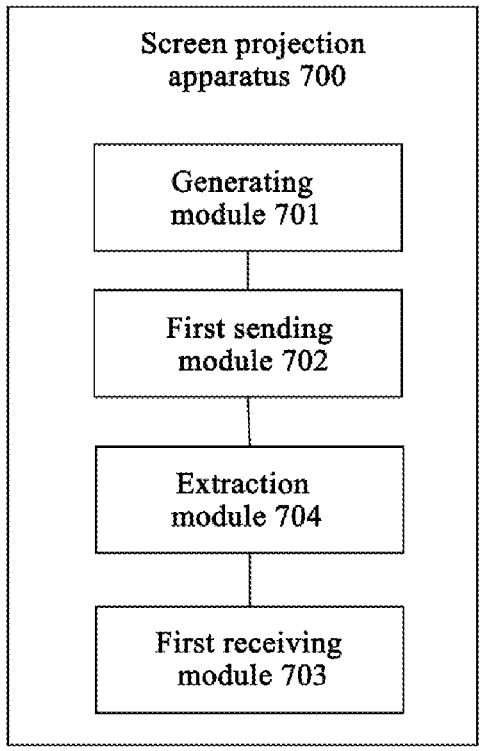
FIG. 7 is a schematic diagram illustrating a structure of a screen projection apparatus according to an embodiment of the present disclosure.

FIG. 7 is a schematic diagram illustrating a structure of a screen projection apparatus according to an embodiment of the present disclosure. As shown in FIG. 7, the screen projection apparatus 700 includes the following modules.

A generating module 701 configured to generate original frame data based on original display data.

The original display data is display data without being subjected to selection, and may be displayed in the user interfaces of the source device and the target device at the same time, that is, the source device projects the original image to the target device.

A first sending module 702 configured to transmit the original frame data to the target device, for the target device to display an original image generated based on the original frame data, where a size of a user interface of the target device is less than a size of a user interface of the source device.

A first receiving module 703 configured to receive target area information transmitted by the target device; where the target area information is position information of a target area to be adjusted on the target device.

In some embodiments, the first sending module 702 and the first receiving module 703 implement data transmission by means of any one of a user datagram protocol (UDP), a data transmission protocol (UDT), and a transmission control protocol (TCP).

An extraction module 704 configured to extract target display data from the original display data based on the target area information.

In some embodiments, the extraction module 704 is configured to determine an encoding area based on the coordinate information of the target area, and extract the target display data from the original display data according to the encoding area.

The generating module 701 is further configured to encode the target display data based on a preset encoding resolution, and generate the target frame data.

The first sending module 702 is further configured to transmit the target frame data to the target device, for the target device to display a target image generated based on the target frame data.

In the screen projection apparatus according to the embodiment of the present disclosure, after the first receiving module receives the target area information, the extracting module extracts the target display data from the original display data based on the target area information, and generates the target frame data based on the target display data, so that dynamically adjusting the display range of the target device is realized, which is convenient for a user to operate on the target device. In addition, since the target display data is directly extracted from the original display data, the resolution of the target display data can be adjusted. Further, compared with the original display data, pixels of the encoding area are reduced in the target display data, so that the resolution of the encoding can be improved, thereby improving the definition of the target device.

In some embodiments, the target area information includes coordinate information of the target area. The extraction module 704 includes a determining unit and an extraction unit. The determining unit is configured to determine the target area based on the coordinate information of the target area. The extraction unit is configured to extract the target display data from the original display data according to the encoding area.

In the embodiment of the present disclosure, the target area may be determined through a movement trajectory of the user on the user interface of the target device. For example, where the target area is a rectangular area, the target area may be determined through drawing a diagonal line or a rectangular box, and the position of the target area may be determined through coordinate information of corners of the rectangular area.

In some embodiments, after receiving the original frame data, the target device processes the original frame data to acquire the original image, and displays the original image on a user interface. The manner of processing the original frame data by the target device is matched with the manner of processing the original display data by the source device. For example, where the source device performs decoding processing on the original display data by means of Media-Codec, the target device decodes the original frame data by means of MediaCodec, to obtain the original image.

In some embodiments, a size of the user interface of the target device is less than a size of the user interface of the source device. That is, the user interface of the source device is larger, and the user interface of the target device is smaller. An image displayed on the source device corresponding to the original image is larger than an image displayed on the target device corresponding to the original image. Especially in a case where the user interface of the source device and the user interface of the target device are quite different from each other, a size of the image displayed on the source device differs greatly from a size of the image displayed on the target device, which is not beneficial for the user to manipulate the UI controls on the target device. Therefore, the image of the UI controls is required to be scaled up on the target device.

In some embodiments, the generating module 701 is configured to encode the target display data based on a preset encoding resolution, to generate the target frame data.

In the embodiment of the present disclosure, the target display data is encoded based on the preset encoding resolution, to generate the target frame data, and since the resolution of the target frame data may be adjusted according to the configuration of the target device, the target image can be clearer.

In some embodiments, the first receiving module 703 is further configured to receive coordinate update information returned by the target device; where the coordinate update information is information determined based on the target area information and a width and a height of the resolution of the source device. The device further includes: a storage module (not shown in the drawings) configured to store the coordinate update information.

The coordinate update information may be determined based on the target area information and the width and height of the resolution of the user interface of the source device, and the coordinate update information may be determined according to formulas (1) to (4) in the embodiment of the first aspect of the present disclosure, which is not described herein again.

In some embodiments, the generating module 701 includes a synthesizing unit and an encoding unit. The synthesizing unit is configured to input display information of the original image into a virtual display device for synthesis, to obtain the display data, where the virtual display device is a virtual display device created by Surface Composer Client. The encoding unit is configured to encode the display data to obtain the original frame data.

For example, taking the Android system as an example, a virtual display device is created through Surface Composer Client, and the virtual display device is registered in a display device list of the Android system. When Surface Flinger has an image update, image update information (a part of target image display information) is sent to the virtual display device to perform a synthesis of an open source graphics library for embedded system (OpenGL for Embedded Systems, abbreviated as GLES), to obtain display data. That is, the virtual display device obtains the image update data of the source device.

While creating the virtual display device, taking Surface of MediaCodec for encoding as BufferQueue, to synchronously acquire the GLES-synthesized display data, and performing H.264 encoding on the display data through MediaCodec, to obtain the target frame data.

The functions of or modules included in the apparatus according to the embodiment of the present disclosure may be used to execute the screen projection method in the method embodiment of the first aspect in the above, and for concrete implementation and technical effects thereof, reference may be made to the description of the method embodiment in the above, and for brevity, details are not described herein again.

In a fourth aspect, a screen projection apparatus according to an embodiment of the present disclosure is applied to a target device (e.g., a portable device), and the screen projection method may dynamically adjust display content of a user interface of the target device, so as to improve definition of the user interface of the target device.

Figure 8:
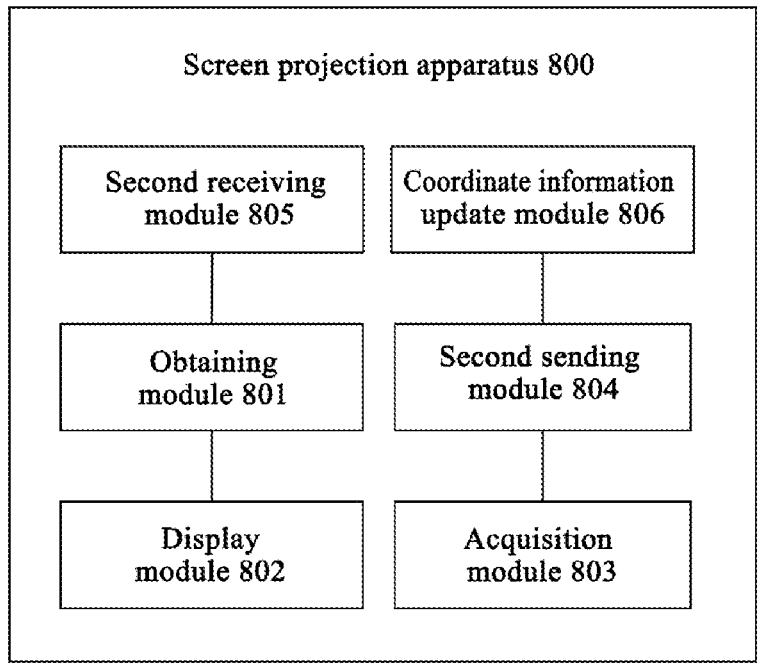
FIG. 8 is a schematic diagram illustrating a structure of a screen projection apparatus according to an embodiment of the present disclosure.

FIG. 8 is a schematic diagram illustrating a structure of a screen projection apparatus according to an embodiment of the present disclosure. As shown in FIG. 8, the screen projection apparatus 800 includes the following modules.

An obtaining module 801 configured to obtain an original image based on original frame data.

The original frame data is frame data generated and transmitted by the source device based on original display data.

Generally, the original display data is not directly sent to the target device, but is processed to obtain the original frame data, and then the original frame data is sent to the target device. In some embodiments, the original display data is encoded to obtain the original frame data. The encoding manner and the format of the original frame data are not limited by the embodiment of the present disclosure. For example, in the Android system, the original display data is encoded by means of MediaCodec, to obtain the original frame data in H.264 format.

In some embodiments, after receiving the original frame data, the target device processes the original frame data to acquire the original image, and displays the original image on a user interface. The manner of processing the original frame data by the target device is matched with the manner of processing the original display data by the source device. For example, where the source device performs decoding processing on the original display data by means of MediaCodec, the target device decodes the original frame data by means of MediaCodec, to obtain the original image.

A display module 802 configured to display the original image.

The display module 802 may be a display screen of the target device.

An acquisition module 803 configured to acquire the target area information.

In some embodiments, a size of the user interface of the target device is less than a size of the user interface of the source device. That is, the user interface of the source device is larger, and the user interface of the target device is smaller. An image displayed on the source device corresponding to the original image is larger than an image displayed on the target device corresponding to the original image. Especially in a case where the user interface of the source device and the user interface of the target device are quite different from each other, a size of the image displayed on the source device differs greatly from a size of the image displayed on the target device, which is not beneficial for the user to manipulate the UI controls on the target device. Therefore, the image of the UI controls is required to be scaled up on the target device, that is, a target area is acquired and scaled up.

The target area information is position information of a target area to be adjusted on the target device. The target area may be any area in the original image. The target area is not limited by the embodiment of the present disclosure. For example, the target area may be an area where the UI control is located.

In some embodiments, the position information of the target area may be information such as a point, a line, or the like, for determining the target area, which is not limited by the embodiment of the present disclosure. For example, the position information of the target area may be coordinate information of some points in the target area.

A second sending module 804 configured to transmit the target area information to the source device.

A second receiving module 805 configured to receive the target frame data. The target frame data is frame data generated by the source device based on target display data, which is extracted from the original display data by the source device, based on the target area information.

In the embodiment of the present disclosure, the second sending module 804 and the second receiving module 805 may perform data transmission by means of any one of a user datagram protocol (UDP), a data transmission protocol (UDT), and a transmission control protocol (TCP).

The obtaining module 801 is further configured to obtain a target image based on the target frame data, and display the target image.

In the embodiment of the present disclosure, the target device decodes the target frame data to obtain the target image, and displays the target image in the user interface.

In some embodiments, the acquisition module 801 includes a decoding unit configured to decode the original frame data to obtain the original image. The decoding mode of the decoding unit is matched with the encoding mode of the source device. For example, where the source device performs decoding processing on the original display data by means of MediaCodec, the target device decodes the original frame data by means of MediaCodec, to obtain the original image.

Figure 9:
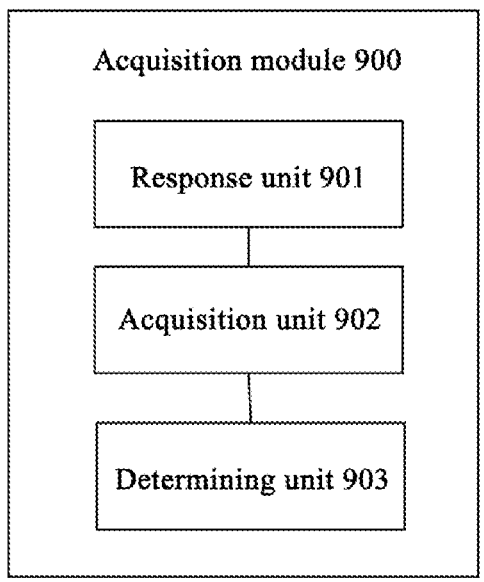
FIG. 9 is a schematic diagram illustrating a structure of an acquisition module according to an embodiment of the present disclosure.

FIG. 9 is a schematic diagram illustrating a structure of an acquisition module according to an embodiment of the present disclosure. As shown in FIG. 9, the acquisition module 900 includes a response unit 901, an acquisition unit 902 and a determining unit 903. The response unit 901 is configured to respond to an activation command; the acquisition unit 902 is configured to acquire trajectory information, where the trajectory information is trajectory information of the movement of a user on the user interface of the target device; and the determining unit 903 is configured to determine the target area information based on the trajectory information.

The activation command is starting information of acquiring the target area, activated by a user on the user interface of the target device, and the trajectory information is information of a movement (touch) trajectory when the user selects the target area on the target device.

In some embodiments, after receiving the activation command, the target device monitors an operation action (e.g., a touch action) of the user on the user interface, acquires trajectory information of the operation action, and then determines the target area information based on the trajectory information. When the selection of the target area is finished, the monitoring on the operation trajectory is finished through an exit command.

In some embodiments, the movement trajectory may be an oblique line, a box shape, or other trajectory through which the target area can be determined. The shape of the target area may be a rectangle or other shape. Referring to FIG. 4a, the movement trajectory is an oblique line, through which a rectangular target area can be determined. Referring to FIG. 4b, the movement trajectory is a box shape, through which a rectangular target area can be determined.

In some embodiments, the determining unit 903 includes a first determining subunit and a second determining subunit. The first determining subunit is configured to determine the coordinates of the start point and the coordinates of the end point of the movement trajectory based on the trajectory information. The second determining subunit is configured to determine the target area information based on the coordinates of the start point and the coordinates of the end point.

For the manner in which the determining unit 903 determines the target area information in the embodiment of the present disclosure, reference is made to step S602 in the screen projection method of the second aspect and FIG. 4a, which is not described herein again.

In some embodiments, the determining unit 903 includes a third determining subunit and a fourth determining subunit. The third determining subunit is configured to determine coordinates of the start point of the movement trajectory and coordinates of an opposite corner opposite to the start point, based on the trajectory information. The fourth determining subunit is configured to determine the target area information based on the coordinates of the start point and the coordinates of the opposite corner.

For the manner in which the determining unit 903 determines the target area information in the embodiment of the present disclosure, reference is made to step S602 in the screen projection method of the second aspect and FIG. 4b, which is not described herein again.

In some embodiments, the screen projection apparatus further includes a coordinate information update module 806, which is configured to determine coordinate update information based on the target area information and a width and a height of the resolution of the source device. The second sending module 804 is further configured to transmit the coordinate update information to the source device.

The coordinate update information may be determined according to formulas (1) to (4) in the embodiment of the present disclosure, which is not described herein again.

In the screen projection apparatus according to the embodiment of the present disclosure, the obtaining module obtains the original image based on the original frame data, the display module displays the original image, after the acquisition module acquires the target area information, then the target area information is sent to the source device by the second sending module, for the source device to obtain the target frame data, the second receiving module receives the target frame data, the obtaining module obtains the target image based on the target frame data, and then the display module displays the target image. Since the sourse device extractes the target display data from the original display data based on the target area information, and generates the target frame data based on the target display data, so that dynamically adjusting the display range is realized, for example, the UI control is locally scaled up, which is convenient for a user to operate on the target device. In addition, since the target display data is directly extracted from the original display data, the resolution of the target display data can be adjusted. Further, compared with the original display data, pixels of the encoding area are reduced in the target display data, so that the resolution of the encoding can be improved, thereby improving the definition of the target device.

Figure 10:
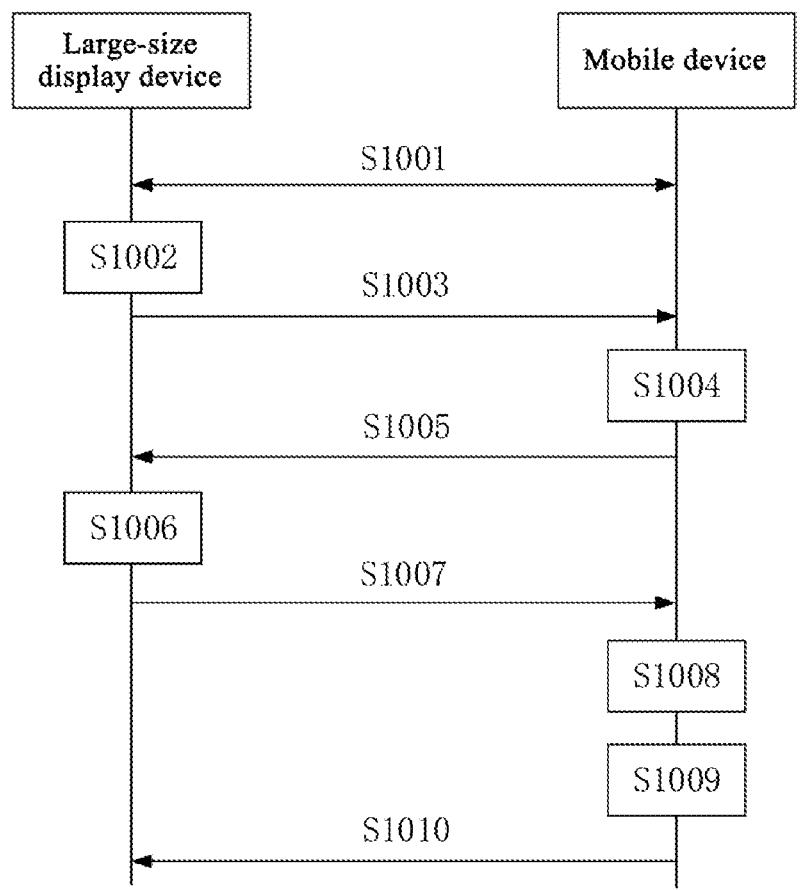
FIG. 10 is a flowchart of a screen projection method according to an embodiment of the present disclosure.

FIG. 10 is a flowchart of a screen projection method according to an embodiment of the present disclosure. The screen projection method takes the Android system as an example, the source device is a large-size display device, the target device is a mobile device, and the large-size display device projects an original image to the mobile device.

In order to better understand the technical solution of the present disclosure, before introducing the screen projection method of the embodiment of the present disclosure, it is necessary to briefly introduce the screen projection manner of the existing Android system.

Android systems are typically based on TextureView (introduced in android4.0 (API level 14)) performing operations of moving and scaling up/down on a target device. TextureView can directly project frame data into the View control, and can be used for realizing functions such as Live preview and the like. But the TextureView does not create a window independently in Window Management (WMS), but is used as a common View control in View hierarchy, and can move, rotate, scale up/down, animation and other changes like other common views. Based on TextureView, the frame data can be displayed, and the characteristics of moving and scaling up/down can be carried out, so that the dynamic adjustment of the screen projection area on the screen display of the mobile terminal device can be realized.

However, since TextureView cannot create a window independently, TextureView cannot run in a thread independent of the UI thread like SurfaceView of the embodiment of the present disclosure, thus UI refresh is inevitably affected. Meanwhile, TextureView is only scaled up at the playing end, and the resolution of frame data cannot be changed, so that the image is more blurred, and the definition is reduced.

The embodiment of the present disclosure adopts SurfaceView to display the image and select the target area on the user interface of the mobile terminal, and re-determines the encoding area based on the target area information in the large-size display device, so that the encoding resolution is improved, and the dynamic adjustment of the display image of the user interface of the mobile terminal is realized.

As shown in FIG. 10, a screen projection method according to the embodiment of the present disclosure includes:

In step S1001, the large-sized display device establishes network connection to the mobile device, and starts a screen projection function.

In step S1002, the large-size display device generates original frame data based on the original display data, while displaying the original image in the user interface.

Figure 11:
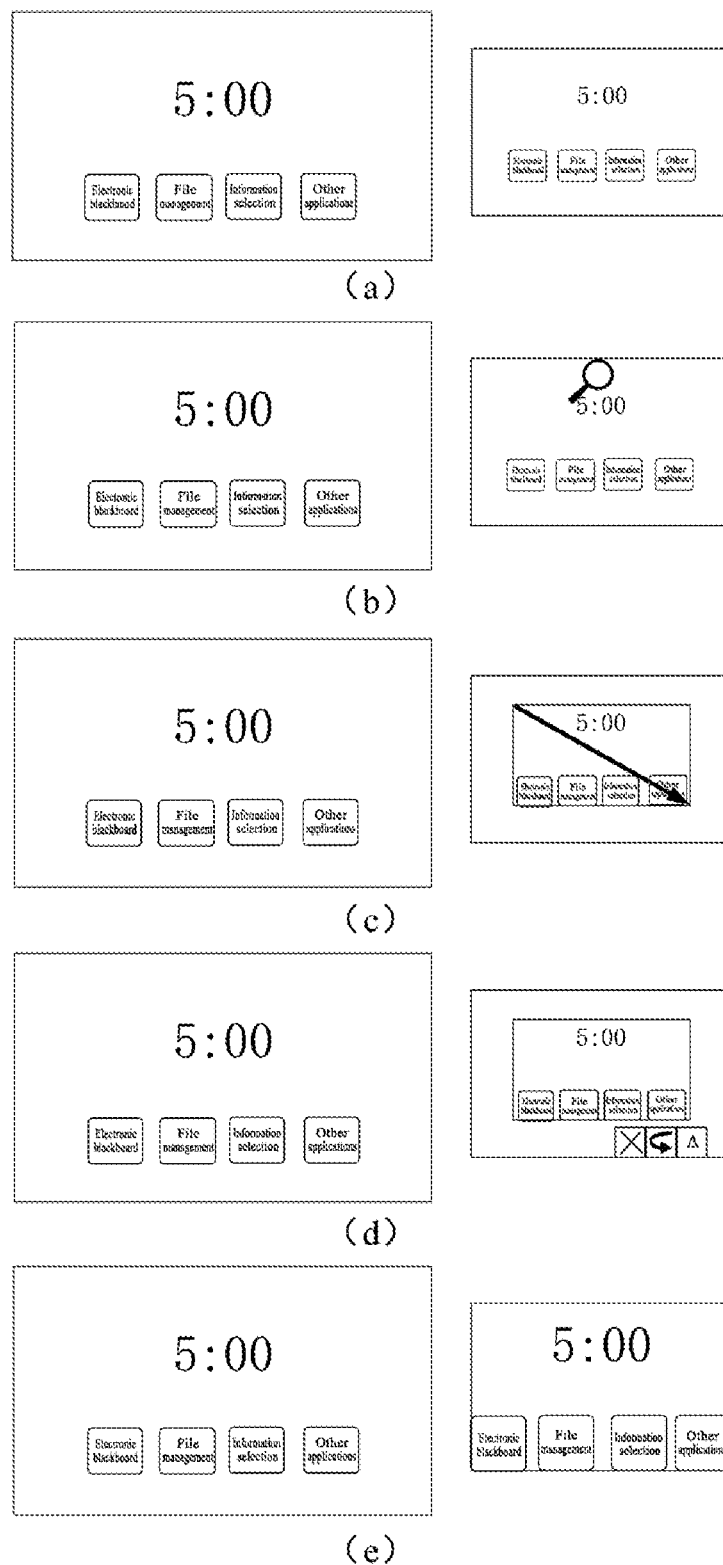
FIGS. 11a to 11e are images displayed by user interfaces of a large-size display device and a mobile terminal in an embodiment of the present disclosure.

In step S1003, the original frame data is projected to the mobile terminal, and as shown in FIG. 11a, the user interfaces of the large-size display device and the mobile device display the same original image.

In step S1004, the user clicks an activation command on the user interface of the mobile terminal, and as shown in FIG. 11b, clicks a pull-down menu of the user interface, selects a scale-up function key, and starts an event of selecting an area. Sliding with a finger on the user interface, the sliding trajectory may be a diagonal line or a rectangular box, and the target area information of the target area that is required to be scaled up may be determined through the trajectory information, as shown in FIG. 11c.

It should be noted that, when the user selects the target area, the selected target area may be discarded by the discard key, the target area may be re-selected by the redraw key, or the selected target area may be confirmed by the confirm key, as shown in FIG. 11d.

It should be noted that, after the mobile terminal obtains the sliding trajectory, the target area information may be determined through the trajectory information, and the target area information is sent to the large-size display device. Alternatively, the mobile terminal directly sends the trajectory information to the large-size display device, and the large-size display device determines the target area information based on the trajectory information.

In step S1005, the mobile terminal sends the target area information to the large-size display device.

In step S1006, the large-size display device recalculates the encoding area based on the target area information, extracts target display data from the original display data, and encodes the target display data, to obtain the target frame data.

In step S1007, the large-size display device sends the target frame data to the mobile device.

In step S1008, the mobile device decodes the target frame data to obtain a target image, and displays the target image in the user interface. In this case, the user interface of the large-size display device displays still the original image, but the user interface of the mobile terminal displays only a video of the target area, that is, an image of the scaled-up target area, as shown in FIG. 11e.

In step S1009, the mobile device recalculates the coordinates of the touch control in data based on the scaled-up target image, to obtain the coordinate update information, and the calculation manner of the coordinate update information refers to formulas (1) to (4), which is not described herein again.

In step S1010, the coordinate update information is sent to the large-size display device, for the large-size display device to calculate the encoding area based on the updated coordinates in the subsequent reverse control.

Figure 12:
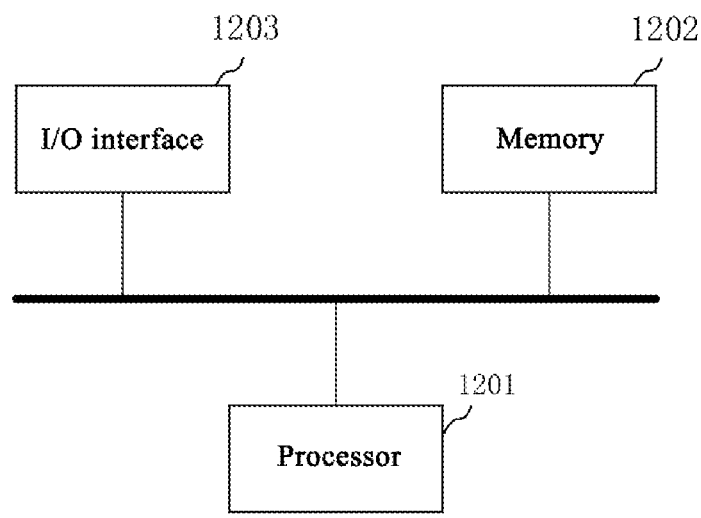
FIG. 12 is a schematic diagram illustrating a structure of an electronic device according to an embodiment of the present disclosure.

Referring to FIG. 12, an embodiment of the present disclosure provides an electronic device, including:
- one or more processors 1201;
- a memory 1202 with one or more programs stored thereon, when the one or more programs are executed by the one or more processors, the one or more processors are caused to implement any one of the device authentication methods described above; and
- one or more I/O interfaces 1203 coupled between the processor and the memory and configured to enable information interaction between the processor and the memory.

The processor 1201 is a device with data processing capability, which includes but is not limited to a central processing unit (CPU), or the like. The memory 1202 is a device having data storage capabilities including, but not limited to, random access memory (RAM, more specifically SDRAM, DDR, etc.), read only memory (ROM), electrically erasable programmable read only memory (EEPROM), flash memory (FLASH). The I/O interface (read/write interface) 1203 coupled between the processor 1201 and the memory 1202 may enable information interaction between the processor 1201 and the memory 1202, which may include, but is not limited to, a data bus (Bus), or the like.

In some embodiments, the processor 1201, the memory 1202, and the I/O interface 1203 are connected to each other through a bus, and in turn to other components of the computing device.

An embodiment of the present disclosure further provide a computer readable medium with a computer program stored thereon, when the program is executed by a processor, the device authentication method according to the embodiment is implemented, and in order to avoid a repeated description, specific steps of the device authentication method are not described herein again.

It will be understood by one of ordinary skill in the art that all or some of the steps of the methods, function modules/units in the systems or apparatus disclosed above may be implemented as software, firmware, hardware, or suitable combinations thereof. In a hardware implementation, a division between the function modules/units mentioned in the above description does not necessarily correspond to a division of physical components. For example, one physical component may have a plurality of functions, or one function or step may be performed by several physical components in cooperation. Some or all of the physical components may be implemented as software executed by a processor, such as a central processing unit, digital signal processor, or microprocessor, or as hardware, or as an integrated circuit, such as an application specific integrated circuit. Such software may be distributed on a computer readable medium, which may include a computer storage medium (a non-transitory medium) and a communication medium (a transitory medium). As is well known to one of ordinary skill in the art, the term "computer storage medium" includes volatile and nonvolatile, removable and non-removable media implemented in any method or technology for storage of information (such as computer readable commands, data structures, program modules or other data). The computer storage medium includes, but is not limited to, RAM, ROM, EPROM, flash memory or other memory technologies, CD-ROM, digital versatile disc (DVD) or other optical disk storage, magnetic cassette, magnetic tape, magnetic disk storage or other magnetic storage apparatuses, or any other medium which can be used to store the desired information and can be accessed by a computer. In addition, as is well known to one of ordinary skill in the art, the communication medium typically contains computer readable commands, data structures, program modules or other data in a modulated data signal such as a carrier wave or other transport mechanism, and includes any information delivery medium.

It should be noted that, in the present disclosure, the terms "comprise", "include", or any other variation thereof, are intended to encompass a non-exclusive inclusion, such that a process, method, article, or apparatus that comprises a list of elements includes not only those elements but also other elements not expressly listed or inherent to such process, method, article, or apparatus. Without further limitation, an element defined by the phrase "comprising a/an . . . " does not exclude the presence of additional identical elements in the process, method, article, or apparatus that comprises the element.

It will be understood that the above embodiments are merely exemplary embodiments adopted to illustrate the principles of the present disclosure/utility model, and the present disclosure/utility model is not limited thereto. It will be apparent to one of ordinary skill in the art that various modifications and improvements can be made without departing from the spirit and scope of the present disclosure/utility model, and such modifications and improvements are also considered to be within the scope of the present disclosure/utility model.

What is claimed is:

1. A screen projection method for a source device, comprising:
generating original frame data based on original display data, and transmitting the original frame data to a target device, for the target device to display an original image generated based on the original frame data;
receiving target area information transmitted by the target device, wherein the target area information is position information of a target area to be adjusted on the target device;
extracting target display data from the original display data, based on the target area information; and
generating target frame data based on the target display data, and transmitting the target frame data to the target device, for the target device to display a target image generated based on the target frame data.

2. The method according to claim 1, wherein the target area information comprises coordinate information of the target area; and
the extracting the target display data from the original display data based on the target area information, comprises:
determining an encoding area based on the coordinate information of the target area; and
extracting the target display data from the original display data according to the encoding area.

3. The method according to claim 2, wherein the generating the target frame data based on the target display data, comprises:
encoding the target display data based on a preset encoding resolution, to generate the target frame data.

4. The method according to claim 1, wherein after the generating the target frame data based on the target display data and sending the target frame data to the target device, the method further comprises:
receiving and storing coordinate update information returned by the target device, wherein the coordinate update information is information determined based on the target area information and a resolution of a user interface of the source device.

5. The method according to claim 1, wherein the generating the original frame data based on the original display data, comprises:
synthesizing the original display data, to obtain display data; and
encoding the display data, to obtain the original frame data.

6. A screen projection apparatus for a source device, wherein the screen projection apparatus is configured to implement the method according to claim 1, and comprises:
a generator configured to generate original frame data based on original display data;
a first sender configured to transmit the original frame data to a target device, for the target device to display an original image generated based on the original frame data;
a first receiver configured to receive target area information transmitted by the target device, wherein the target area information is position information of a target area to be adjusted on the target device; and
an extractor configured to extract target display data from the original display data based on the target area information,
wherein the generator is further configured to generate target frame data based on the target display data; and
the first sender is further configured to transmit the target frame data to the target device, for the target device to display a target image generated based on the target frame data.

7. The apparatus according to claim 6, wherein the target area information comprises coordinate information of the target area; and
the extractor comprises:
a determiner configured to determine an encoding area based on coordinate information of the target area; and a sub-extractor configured to extract the target display data from the original display data according to the encoding area.

8. An electronic device, comprising:
one or more processors;
a memory with one or more programs stored thereon, wherein when the one or more programs are executed by the one or more processors, the one or more processors are caused to implement the method according to claim 1; and
one or more I/O interfaces connected between the one or more processors and the memory, and configured to enable information interaction between the one or more processor and the memory.

9. A non-transitory computer readable medium with a computer program stored thereon, wherein when the program is executed by a processor, the method according to claim 1 is implemented.

10. A screen projection method for a target device, comprising:
obtaining an original image based on original frame data, and displaying the original image, wherein the original frame data is frame data generated and transmitted by a source device based on original display data;
acquiring target area information, and transmitting the target area information to the source device;
receiving target frame data, wherein the target frame data is frame data generated by the source device based on target display data, which is extracted from the original display data by the source device, based on the target area information; and
obtaining a target image based on the target frame data, and displaying the target image.

11. The method according to claim 10, wherein the acquiring the original image based on the original frame data and displaying the original image, comprises:
decoding the original frame data to obtain the original image; and
displaying the original image in a user interface.

12. The method according to claim 10, wherein the acquiring the target area information, comprises:
acquiring trajectory information in response to an activation command, wherein the trajectory information is information of a trajectory when a user selects a target area on the target device; and
determining the target area information based on the trajectory information.

13. The method according to claim 12, wherein the determining the target area information based on the trajectory information, comprises:
determining coordinates of a start point and coordinates of an end point of a movement trajectory based on the trajectory information, and
determining the target area information based on the coordinates of the start point and the coordinates of the end point.

14. The method according to claim 12, wherein the determining the target area information based on the trajectory information, comprises:
determining coordinates of a start point and coordinates of an opposite corner opposite to the start point of a movement trajectory, based on the trajectory information; and determining the target area information based on the coordinates of the start point and the coordinates of the opposite corner.

15. The method according to claim 10, wherein after the obtaining the target image based on the target frame data and displaying the target image, the method further comprises:
determining coordinate update information based on the target area information and a width and a height of a resolution of the source device; and
transmitting the coordinate update information to the source device.

16. A screen projection apparatus for target device, wherein the screen projection apparatus is configured to implement the method according to claim 10, and comprises:
an obtainer configured to obtain an original image based on original frame data, wherein the original frame data is frame data generated and transmitted by a source device based on original display data;
a display configured to display the original image;
an acquirer configured to acquire target area information;
a second sender configured to transmit the target area information to the source device;
a second receiver configured to receive target frame data, wherein the target frame data is frame data generated by the source device based on target display data, which is extracted from the original display data by the source device, based on the target area information, and
the obtainer is further configured to obtain a target image based on the target frame data; and
the display is further configured to display the target image.

17. The apparatus according to claim 16, wherein the obtainer comprises:
a decoder configured to decode the original frame data to obtain the original image.

18. The apparatus according to claim 16, wherein the acquirer comprises:
a responder configured to respond to an activation command;
a sub-acquirer configured to acquire trajectory information, wherein the trajectory information is information of a movement trajectory of a user on a user interface of the target device; and
a determiner configured to determine the target area information based on the trajectory information.

19. An electronic device, comprising:
one or more processors;
a memory with one or more programs stored thereon, wherein when the one or more programs are executed by the one or more processors, the one or more processors are caused to implement the method according to claim 10; and
one or more I/O interfaces connected between the one or more processors and the memory, and configured to enable information interaction between the one or more processor and the memory.

20. A non-transitory computer readable medium with a computer program stored thereon, wherein when the program is executed by a processor, the method according to claim 10 is implemented.

* * * * *